May 1, 1928.
R. A. WEINHARDT
MOTOR VEHICLE
Filed March 13, 1926
1,668,295
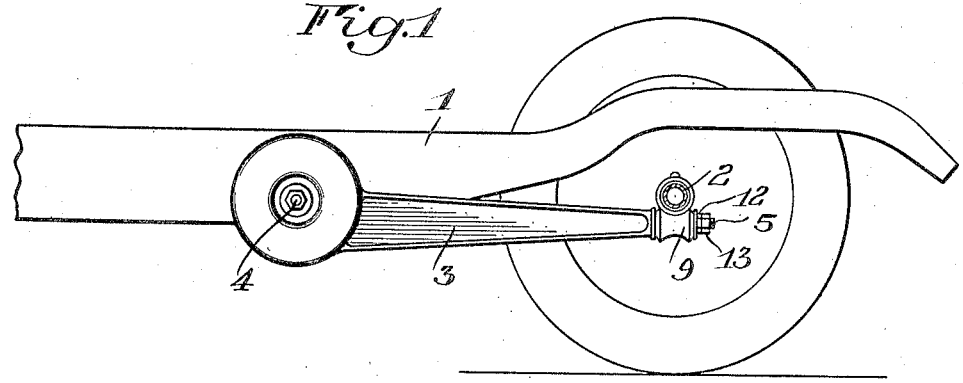
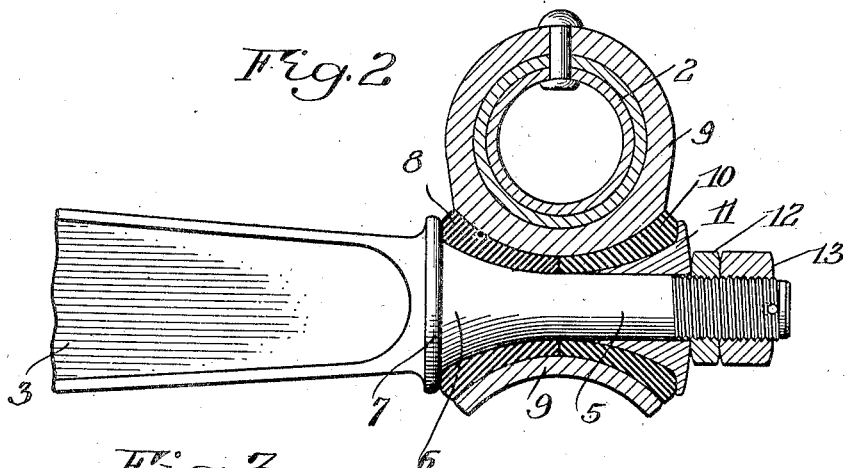
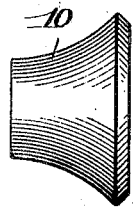
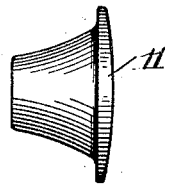
INVENTOR
Robert A. Weinhardt
Harold E. Stonebraker
his ATTORNEY Patented May 1, 1928.

1,668,295

UNITED STATES PATENT OFFICE.

ROBERT A. WEINHARDT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 13, 1926. Serial No. 94,565.

This invention relates to a motor vehicle, and has particular reference to a connecting means between an axle and an arm such as employed in the suspension construction illustrated in Patent No. 1,515,716, November 18, 1924, or in connecting a frame with a conventional torque arm.

The principal object of the invention is to afford a simple and practicable construction for connecting such an arm to an axle, so as to permit slight relative universal movement between said parts.

A further purpose of the invention is to provide a yielding or flexible connection with such an arm so as to hold the parts together securely and at the same time permit the necessary relative movements due to uneven positions of the axle with reference to the frame.

An additional object of the invention is to afford a flexible joint with such an arm, of a character that makes lubrication unnecessary and eliminates rattle or noise between the connected parts.

In a more particular aspect, the invention has for its purpose to afford a connecting means depending upon compressing a rubber body or bushing between the arm and the member to which it is connected, so that relative yielding motion between the parts is taken up directly by the rubber or resilient body.

With these ends in view, the invention comprises the construction and arrangement of parts that will appear from the following description, when read in conjunction with the accompanying drawing, the novel features being pointed out in the claims following the description.

In the drawing:

Figure 1 is a side elevation showing a portion of a motor vehicle frame and the general relation thereto of a connecting arm between the frame and axle;

Figure 2 is an enlarged sectional view through the axle and rubber bushing;

Figure 3 is a detail perspective view of one of the rubber bushings, and

Figure 4 is a detail view of the tapered metal bushing.

Referring more particularly to the drawing, in which like reference numerals refer to the same parts throughout the several views, 1 designates a side member of a conventional motor vehicle frame, and 2 is an axle, while 3 is an arm connected at one end to the axle and at its opposite end to the frame. The arm 3 is connected to the frame so as to have a slight relative movement about a horizontal axis or bearing 4, such as forms part of the patented structure already mentioned, and which includes a rubber block clamped between the connecting arm and frame and having groove and rib connection with said parts.

With such a suspension, or with a torque arm structure, it is desirable to connect the arm by means of a joint that permits a certain amount of flexibility or universal relative movement between the parts, in the present instance, between the arm and axle, and to this end, the joint between the arm and axle is through a rubber body or bushing that is interposed between the arm and axle under pressure so as to permit the desired yielding and yet resist such movement sufficiently so that a secure connection between the parts is maintained.

A preferred embodiment of means for accomplishing this includes a cylindrical end 5 on the connecting arm terminating at its inner end in an outwardly flaring portion 6, while 7 is a shoulder against which abuts the inner end of a tapered rubber bushing 8. Said rubber bushing 8 is of concavo-convex formation, its inner surface engaging the flaring portion 6 and its outer surface engaging a convex bearing that is provided in the boss 9 of the axle. 10 designates a second rubber bushing similar to the one already described, and contacting therewith at its inner end, while 11 is a tapered metal bushing fitting on the end 5 of the arm and engaging the inner surface of the bushing 10 to hold the latter tightly against the adjacent convex surface of the bearing, as shown in Figure 2. The metal bushing 11 is held in place and the parts retained in operative relationship by a nut 12 and lock nut 13.

In assembling the joint, the inner rubber bushing 8 is first inserted on to the end of the arm in the position shown in Figure 2, the arm is then inserted through the bearing in the boss 9, and following this, the outer rubber bushing 10 and metal bushing 11 are successively forced into place. Then by threading on the nuts 12 and 13, the rubber bushings are properly compressed and the parts maintained securely in tight relationship. Under normal conditions, the relation between the connecting arm and axle is the same as though they were rigidly connected, but in the event of the axle assuming an uneven position with reference to the frame of the motor vehicle, or being subjected to a twisting action, it is taken up by the rubber bushings 8 and 10 which permit sufficient relative motion between the axle and connecting arm to eliminate any strain or permanent distortion of the parts. This construction permits a noiseless yielding between the axle and connecting arm, requiring no lubrication, and can be used to advantage in uniting one end of a connecting arm to an axle or motor vehicle frame, or wherever relative movement in two different planes is desirable.

While the invention has been described with reference to a certain structure, it is not restricted to the details herein disclosed, and this application is intended to cover such modifications or departures as may come within the underlying purposes of the improvement or the scope of the following claims.

I claim:

1. In a motor vehicle, the combination with a frame and axle, of an arm, means for connecting one of said members with the arm including a concave supporting surface on the arm, said member having a convex bearing to receive the end of the arm, a concavo-convex rubber bushing interposed between said concave supporting surface on the arm and said bearing, and means for drawing said parts into operative relationship and compressing the rubber body therebetween.

2. In a motor vehicle, the combination with a frame and axle, of an arm, means for connecting one of said members to the arm including a cylindrical portion on the arm terminating in an outwardly flaring surface, a shoulder at the end of said outwardly flaring surface, said member being provided with a convex bearing, an inner rubber bushing of concavo-convex formation surrounding the flaring surface of the arm and engaging said shoulder, an outer rubber bushing of similar shape to the first named bushing and in engagement therewith, a tapered metal bushing interposed between the cylindrical part of the arm and the convex surface of the outer rubber bushing, and means for forcing the metal bushing on to the arm to compress said rubber bushings and retain the arm in operative relationship with said member.

3. In a motor vehicle, the combination with a frame, of an arm connected at one end to said frame, an axle substantially perpendicular to said arm and capable of oscillation about said arm as an axis, and means for connecting said arm to said axle so as to permit said oscillation, said means including a bearing surface on said arm, a second bearing surface on said axle concentric with the first-named bearing surface and spaced therefrom, and a rubber body filling the space between said two bearing surfaces.

4. In a motor vehicle, the combination with a frame, of an arm connected at one end to said frame, an axle crossing said arm and capable of oscillation about said arm as an axis, and means for connecting said arm to said axle so as to permit said oscillation, said means including a bearing surface substantially circular in cross-section on said arm, a second bearing surface on said axle surrounding and spaced from said first-named bearing surface, a rubber body filling the space between said two bearing surfaces, and means for compressing the rubber body in said space.

In witness whereof, I have hereunto signed my name.

ROBERT A. WEINHARDT.